United States Patent
Wang et al.

(10) Patent No.: US 11,451,353 B2
(45) Date of Patent: Sep. 20, 2022

(54) COMMUNICATION METHOD OF REFERENCE SIGNAL AND NON-TRANSITORY STORAGE MEDIUM

(71) Applicant: ZTE CORPORATION, Guangdong (CN)

(72) Inventors: Yuxin Wang, Guangdong (CN); Zhaohua Lu, Guangdong (CN); Yu Ngok Li, Guangdong (CN); Chuangxin Jiang, Guangdong (CN)

(73) Assignee: ZTE CORPORATION

( * ) Notice: Subject to any disclaimer, the term of this patent is extended or adjusted under 35 U.S.C. 154(b) by 64 days.

(21) Appl. No.: 16/770,245

(22) PCT Filed: Dec. 7, 2018

(86) PCT No.: PCT/CN2018/119919
§ 371 (c)(1),
(2) Date: Jun. 5, 2020

(87) PCT Pub. No.: WO2019/110017
PCT Pub. Date: Jun. 13, 2019

(65) Prior Publication Data
US 2020/0374071 A1     Nov. 26, 2020

(30) Foreign Application Priority Data
Dec. 8, 2017 (CN) .......................... 201711299493.3

(51) Int. Cl.
*H04W 4/00* (2018.01)
*H04L 5/00* (2006.01)
*H04W 72/04* (2009.01)

(52) U.S. Cl.
CPC ....... *H04L 5/0048* (2013.01); *H04W 72/0446* (2013.01)

(58) Field of Classification Search
CPC .......................... H04L 5/0048; H04W 72/0446
USPC ......................................................... 370/329
See application file for complete search history.

(56) References Cited

FOREIGN PATENT DOCUMENTS

| | | |
|---|---|---|
| CN | 106716899 A | 5/2017 |
| CN | 107210801 A | 9/2017 |
| CN | 108112081 A | 6/2018 |
| JP | 2019517201 | 6/2019 |

(Continued)

OTHER PUBLICATIONS

Samsung (R1-1720313, "Remaining details on SRS", Reno, USA, Nov. 27-Dec. 1, 2017) (Year: 2017).*

(Continued)

*Primary Examiner* — Maharishi V Khirodhar
(74) *Attorney, Agent, or Firm* — McDonald Hopkins LLC

(57) ABSTRACT

A communication method includes: determining a radio resource for a second communication node to send a reference signal; and receiving the reference signal sent by the second communication node using the radio resource; where the radio resource includes a time domain resource, and where determining the radio resource for the second communication node to send the reference signal includes: determining, by the first communication node, the time domain resource according to the following parameters: a period of the reference signal, and a slot offset of the reference signal.

16 Claims, 1 Drawing Sheet

S202 — Determine a radio resource for sending a reference signal

S204 — Send the reference signal using the radio resource to a first communication node

(56) References Cited

FOREIGN PATENT DOCUMENTS

WO    2017196083 A1    11/2017

OTHER PUBLICATIONS

OPPO (R1-1718029, "further discussion on SRS design for NR", Prague, Czech Republic, Oct. 9-13, 2017) (Year: 2017).*
Ericsson (R1-1721384, "Remaining details on SRS design" Reno, USA, Nov. 27-Dec. 1, 2017) (Year: 2017).*
ETRI (R1-1720223, "Remaining details on SRS design for NR", Reno, USA, Nov. 27-Dec. 1, 2017). (Year: 2017).*
LG (R1-171 9914, "On SRS design", Reno, USA, Dec. 1-27, 2017). (Year: 2017).*
Ericsson (R1-1720744, Reno, USA, Nov. 27-Dec. 1, 2017, "remaining details on SRS design") (Year: 2017).*
CATT ( Reno, USA, Nov. 27-Dec. 1, 2017, R1-1720188, discussion on remaining details of SRS design). (Year: 2017).*
Huawei (R1-1719441, Reno, USA, Nov. 27-Dec. 1, 2017, "remaining details on SRS design" (Year: 2017).*
Samsung, "Remaining details on SRS," R1-1720313, 3GPP TSGRAN WG1 Meeting Jan. 2017. USA.
Ericsson, "Remaining details on SRS design," R1-1721384, Moble Competence Centre. 2017. France.
Ericsson, "Discussion on SRS frequency hopping in NR," R1-1721385, Moble Competence Centre. 2017. France.
Zte et al., "Remaining details on SRS," R1-1719544, Moble Competence Centre. 2017. France.
Extended European Search Report for Application 18885759.3, PCT/CN2018119919, dated Jul. 6, 2021, 10 pgs., European Patent Office, Germany.
Japan Patent Office (JPO), Notification of Reasons for Refusal for Patent Application No. 2020-531483, drafted Aug. 19, 2021, Fourth Patent Examination Department, Japan.
English Translation of International Search Report dated Feb. 28, 2019; International Patent Application No. PCT/CN2018/119919 filed Dec. 8, 2017; ISA/CN.
Sony, "Summary of SRS," R1-1721683, 3GPP TSGRAN WG1 Meeting 91.2017. USA.
Japan Patent Office (JPO), Notification of Reasons for Rejection for Patent Application No. 2020-531483, drafted Apr. 14, 2022, dated Apr. 19, 2022, Fourth Patent Examination Department, Japan.
Korean Intellectual Property Office, Notification of Reason for Refusal for Application No. 10-2020-7019690, dated Feb. 17, 2022.

* cited by examiner ations, and the UE will also be
COMMUNICATION METHOD OF REFERENCE SIGNAL AND NON-TRANSITORY STORAGE MEDIUM

CROSS-REFERENCE TO RELATED APPLICATIONS

This is a National Stage Application, filed under 35 U.S.C. 371, of International Patent Application No. PCT/CN2018/119919, filed Dec. 7, 2018, which claims priority to Chinese patent application No. 201711299493.3 filed with the CNIPA on Dec. 8, 2017, the contents of both are incorporated herein by reference in their entireties.

TECHNICAL FIELD

The present disclosure relates to the field of communications, for example, to a communication method and system.

BACKGROUND

Generally, in uplink communications, a non-precoded reference signal, i.e., an antenna-specific reference signal, should be used, while a demodulation reference signal (DMRS) for a physical uplink shared channel (PUSCH) is precoded. An e-Node-B (eNB) may estimate original uplink channel state information (CSI) by receiving the non-precoded reference signal sent by a user equipment (UE), while cannot estimate the original uplink CSI through the precoded DMRS. At this time, when the UE sends the non-precoded reference signal by using multiple antennas, more reference signal resources are required by each UE, which results in a decrease in the number of UEs simultaneously multiplexable in a system. The UE may send the reference signal through two trigger types, i.e., higher-layer signaling (also referred to as trigger type 0) or downlink control information (also referred to as trigger type 1). A periodic reference signal is triggered based on the higher-layer signaling, and an aperiodic reference signal is triggered based on the downlink control information. A manner of aperiodically sending the reference signal improves a utilization rate of reference signal resources and improves resource scheduling flexibility to some extent.

With the development of communication technologies, the demand for data traffic is increasing and available low-frequency carriers are in short supply. Therefore, high-frequency (30 to 300 GHz) carrier communication that has not been fully utilized becomes an important communication way of achieving high-speed data communication. The high-frequency carrier communication has a large available bandwidth and can provide effective high-speed data communication. However, the high-frequency carrier communication faces a very big technical challenge that a high-frequency signal fades greatly in space relative to a low-frequency signal. Although the high-frequency carrier communication will cause spatial fading losses when the high-frequency signal is used for outdoor communications, the shorter wavelength of the high-frequency signal generally allows more antennas to be used. Therefore, beam-based communications may be performed to compensate for the spatial fading losses.

However, when the number of antennas increases, each antenna needs a set of radio frequency links, and digital beamforming also brings about an increase in costs and power losses. Therefore, studies tend to hybrid beamforming, that is, a final beam formed by a radio frequency beam and a digital beam.

In a new radio access technology (NR), for a high-frequency communication system, the eNB will be configured with a large number of antennas to form downlink transmission beams to compensate for the spatial fading of high-frequency communications, and the UE will also be configured with a large number of antennas to form uplink transmission beams. At this time, the reference signal will also be sent in the form of a beam. In addition, in an NR system, a frame structure has significant changes compared with that in an LTE/LTE-A system, and intra-slot frequency hopping is added to inter-slot frequency hopping. Therefore, a method for sending the reference signal in the LTE/LTE-A system cannot be applied to the NR system. It is still unknown how to send the reference signal corresponding to the NR system in the related art.

SUMMARY

The present disclosure provides a communication method and system to provide at least a manner for sending a reference signal in an NR system, so as to effectively send the reference signal in the NR system.

The present disclosure provides a communication method applied to a first communication node. The method includes: determining a radio resource for a second communication node to send a reference signal; and receiving the reference signal sent by the second communication node using the radio resource.

The present disclosure further provides a communication method applied to a second communication node. The method includes: determining a radio resource for sending a reference signal; and sending the reference signal using the radio resource to a first communication node.

The present disclosure further provides a communication system, including a first communication node and a second communication node. The first communication node includes a first determining module and a receiving module. The first determining module is configured to determine a radio resource for the second communication node to send a reference signal. The receiving module is configured to receive the reference signal sent by the second communication node using the radio resource. The second communication node includes a second determining module and a sending module. The second determining module is configured to determine the radio resource for sending the reference signal. The sending module is configured to send the reference signal using the radio resource.

The present disclosure further provides a storage medium, including stored programs, where the programs, when executed, perform any one of the methods described above.

The present disclosure further provides a processor, which is configured to execute programs, where the programs, when executed, perform any one of the methods described above.

DETAILED DESCRIPTION

Figure 1:
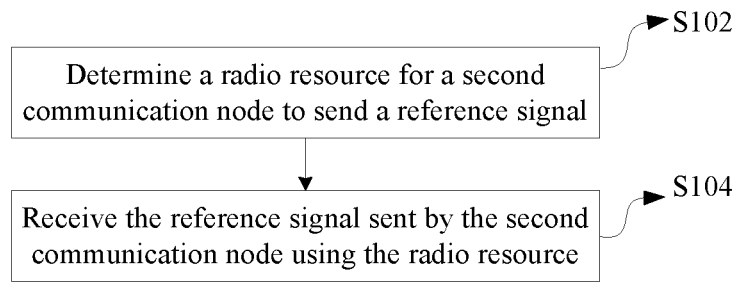
FIG. 1 is a flowchart of a communication method according to an embodiment.

The present disclosure will be described hereinafter in detail with reference to the drawings and in conjunction with embodiments.

The terms "first", "second" or the like in the description, claims and above-mentioned drawings of the present disclosure are used to distinguish between similar objects and are not necessarily used to describe a particular order or sequence.

In Long Term Evolution (LTE), a physical downlink control channel (PDCCH) is used for bearing uplink scheduling information, downlink scheduling information and uplink power control information. Downlink control information (DCI) formats include DCI formats 0, 1, 1A, 1B, 1C, 1D, 2, 2A, 3, 3A, etc.; and DCI formats 2B, 2C, and 2D are added in later evolution to support a variety of different applications and transmission modes. An e-Node-B (eNB) may configure a UE through the downlink control information, or the UE is configured by higher layers, which is also referred to as a configuration of the UE through higher-layer signaling. A sounding reference signal is a signal used by the UE and the eNB to measure radio CSI. In an LTE system, the UE regularly sends an uplink reference signal on a last data symbol of a sending subframe according to parameters indicated by the eNB, such as a frequency band, a frequency domain position, a cyclic shift of a sequence, a period and a subframe offset. The eNB determines uplink CSI of the UE according to the received reference signal, and performs operations such as frequency domain selection scheduling and closed loop power control according to the obtained CSI.

In an LTE/LTE-Advanced (LTE-A) system, when a length of a reference signal sequence is less than 72, the number of available reference signal root sequences is 30; when the length of the reference signal sequence is greater than or equal to 72 and a group jump function is disabled, the number of available reference signal root sequences is 60; and when the length of the reference signal sequence is greater than or equal to 72 and the group jump function is enabled, the number of available reference signal root sequences is 30.

Executable network architecture in the present disclosure includes a first communication node and a second communication node, where the first communication node interacts with the second communication node.

The first communication node refers to a node configured to determine a sending manner of the second communication node and perform a signaling indication to the second communication node, and the second communication node refers to a node configured to receive the signaling indication. In an implementation manner, the first communication node may be a base station of a macro cell, a base station or a transmission node of a small cell, a sending node in a high-frequency communication system, a sending node in an Internet of Things system or the like, and the second communication node may be a node in a communication system, such as a UE, a mobile phone, a portable device or a car. In another implementation manner, the base station of the macro cell, the base station or the transmission node of the small cell, the sending node in the high-frequency communication system, the sending node in the Internet of Things system or the like may serve as the second communication node, and the UE or the like may serve as the first communication node.

The reference signal includes at least the uplink reference signal which may be the sounding reference signal (SRS), an uplink DMRS or an uplink random access signal.

Embodiment One

This embodiment provides a communication method executed on the network architecture described above. FIG. 1 is a flowchart of a communication method according to an embodiment. The method is applied to a first communication node. As shown in FIG. 1, the method includes steps S102 and S104.

In S102, a radio resource for a second communication node to send a reference signal is determined.

In S104, the reference signal sent by the second communication node using the radio resource is received.

In this embodiment, after the radio resource for the second communication node to send the reference signal is determined, the reference signal sent by the second communication node using the radio resource may be acquired from the determined radio resource.

In this embodiment, the radio resource includes a time domain resource or a frequency domain resource.

In an embodiment, the first communication node determines the time domain resource according to at least one of the following parameters: a period of an uplink sounding reference signal, a slot offset of the reference signal, a system frame number, a slot index within a frame, a quantity of slots in one subframe or a quantity of slots in one system frame.

In an embodiment, the first communication node determines the period of the reference signal and the slot offset of the reference signal according to a configuration index of the reference signal, where determining manners are shown in Table 1, Table 2, Table 3 or Table 4.

TABLE 1

| SRS Configuration Index $I_{SRS}$ | SRS Period $T_{SRS}$ (Slots) | SRS Slot Offset $T_{offset}$ |
| --- | --- | --- |
| 0 | 1 | $I_{SRS}$ |
| 1-2 | 2 | $I_{SRS} - 1$ |
| 3-7 | 5 | $I_{SRS} - 3$ |
| 8-17 | 10 | $I_{SRS} - 8$ |
| 18-37 | 20 | $I_{SRS} - 18$ |
| 38-77 | 40 | $I_{SRS} - 38$ |
| 78-157 | 80 | $I_{SRS} - 78$ |
| 158-317 | 160 | $I_{SRS} - 158$ |
| 318-637 | 320 | $I_{SRS} - 318$ |
| 638-1277 | 640 | $I_{SRS} - 638$ |
| 1278-2557 | 1280 | $I_{SRS} - 1278$ |
| 2558-5117 | 2560 | $I_{SRS} - 2558$ |
| 5118-8191 | Reserved | Reserved |

TABLE 2

| SRS Configuration Index $I_{SRS}$ | SRS Period $T_{SRS}$ (Slots) | SRS Slot Offset $T_{offset}$ |
| --- | --- | --- |
| 0 | 1 | $I_{SRS}$ |
| 1-2 | 2 | $I_{SRS} - 1$ |
| 3-6 | 4 | $I_{SRS} - 3$ |
| 7-11 | 5 | $I_{SRS} - 7$ |
| 12-19 | 8 | $I_{SRS} - 12$ |
| 20-29 | 10 | $I_{SRS} - 20$ |
| 30-45 | 16 | $I_{SRS} - 30$ |
| 46-65 | 20 | $I_{SRS} - 46$ |
| 66-97 | 32 | $I_{SRS} - 66$ |
| 98-137 | 40 | $I_{SRS} - 98$ |
| 138-201 | 64 | $I_{SRS} - 138$ |
| 202-281 | 80 | $I_{SRS} - 202$ |
| 282-441 | 160 | $I_{SRS} - 282$ |
| 442-761 | 320 | $I_{SRS} - 442$ |
| 762-1401 | 640 | $I_{SRS} - 762$ |
| 1402-2681 | 1280 | $I_{SRS} - 1402$ |
| 2682-5241 | 2560 | $I_{SRS} - 2682$ |
| 5242-8191 | Reserved | Reserved |

TABLE 3

| SRS Configuration Index $I_{SRS}$ | SRS Period $T_{SRS}$ (Slots) | SRS Slot Offset $T_{offset}$ |
| --- | --- | --- |
| 0 | 1 | $I_{SRS}$ |
| 1-2 | 2 | $I_{SRS}$ − 1 |
| 3-6 | 4 | $I_{SRS}$ − 3 |
| 7-11 | 5 | $I_{SRS}$ − 7 |
| 12-19 | 8 | $I_{SRS}$ − 12 |
| 20-29 | 10 | $I_{SRS}$ − 20 |
| 30-45 | 16 | $I_{SRS}$ − 30 |
| 46-65 | 20 | $I_{SRS}$ − 46 |
| 66-97 | 32 | $I_{SRS}$ − 66 |
| 98-137 | 40 | $I_{SRS}$ − 98 |
| 138-201 | 64 | $I_{SRS}$ − 138 |
| 202-281 | 80 | $I_{SRS}$ − 202 |
| 282-409 | 128 | $I_{SRS}$ − 282 |
| 410-569 | 160 | $I_{SRS}$ − 410 |
| 570-825 | 256 | $I_{SRS}$ − 570 |
| 826-1145 | 320 | $I_{SRS}$ − 826 |
| 1146-1657 | 512 | $I_{SRS}$ − 1146 |
| 1658-2297 | 640 | $I_{SRS}$ − 1658 |
| 2298-3321 | 1024 | $I_{SRS}$ − 2298 |
| 3322-4601 | 1280 | $I_{SRS}$ − 3322 |
| 4602-6649 | 2048 | $I_{SRS}$ − 4602 |
| 6650-9209 | 2560 | $I_{SRS}$ − 6650 |
| 9210-16383 | Reserved | Reserved |

TABLE 4

| SRS Configuration Index $I_{SRS}$ | SRS Period $T_{SRS}$ (Slots) | SRS Slot Offset $T_{offset}$ |
| --- | --- | --- |
| 0 | 1 | $I_{SRS}$ |
| 1-2 | 2 | $I_{SRS}$ − 1 |
| 3-6 | 4 | $I_{SRS}$ − 3 |
| 7-11 | 5 | $I_{SRS}$ − 7 |
| 12-19 | 8 | $I_{SRS}$ − 12 |
| 20-29 | 10 | $I_{SRS}$ − 20 |
| 30-45 | 16 | $I_{SRS}$ − 30 |
| 46-65 | 20 | $I_{SRS}$ − 46 |
| 66-97 | 32 | $I_{SRS}$ − 66 |
| 98-137 | 40 | $I_{SRS}$ − 98 |
| 138-201 | 64 | $I_{SRS}$ − 138 |
| 202-281 | 80 | $I_{SRS}$ − 202 |
| 282-409 | 128 | $I_{SRS}$ − 282 |
| 410-569 | 160 | $I_{SRS}$ − 410 |
| 570-825 | 256 | $I_{SRS}$ − 570 |
| 826-1145 | 320 | $I_{SRS}$ − 826 |
| 1146-1657 | 512 | $I_{SRS}$ − 1146 |
| 1658-2297 | 640 | $I_{SRS}$ − 1658 |
| 2298-3321 | 1024 | $I_{SRS}$ − 2298 |
| 3322-4601 | 1280 | $I_{SRS}$ − 3322 |
| 4602-7161 | 2560 | $I_{SRS}$ − 4602 |
| 7162-8191 | Reserved | Reserved |

In an embodiment, the period of the reference signal and the slot offset of the reference signal have a unit of slots or milliseconds.

In an embodiment, the time domain resource satisfies one of the following relationships: $(10 \cdot n_f N_{slot}^{subframe,\mu} + n_{s,f}^{\mu} - T_{offset}) \bmod T_{SRS} = 0$ or $(n_f N_{slot}^{frame,\mu} + n_{s,f}^{\mu} - T_{offset}) \bmod T_{SRS} = 0$; where $n_{s,f}^{\mu} \in \{0, \ldots, N_{slot}^{frame,\mu} - 1\}$, $n_{s,f}^{\mu}$ is the slot index within a frame, $n_f$ is the system frame number, $N_{slot}^{subframe,\mu}$ the quantity of slots in one subframe, $N_{slot}^{frame,\mu}$ the quantity of slots in one system frame, $T_{offset}$ the slot offset of the reference signal, and $T_{SRS}$ is the period of the reference signal; where the reference signal is the uplink sounding reference signal.

Embodiment Two

Based on Embodiment one, the first communication node determines the frequency domain resource by a method described below.

In an embodiment, a frequency domain position of the reference signal is determined according to a quantity or number of an uplink reference signal to be sent in time domain, and the frequency domain resource is determined according to the frequency domain position.

In an embodiment, the quantity or number of the uplink reference signal to be sent in time domain is determined based on at least one of the following parameters: a slot index within a frame, a system frame number, a period of the reference signal, a slot offset of the reference signal, a quantity of slots in one subframe, a quantity of slots in one system frame, a quantity of time domain symbols for sending the reference signal within a slot, a quantity of time domain symbols repeated within the slot or a quantity of time domain symbols of the reference signal occupying a same frequency domain position within the slot, or an index or number of a time domain symbol for sending the reference signal within the slot.

In an embodiment, the first communication node determines a manner for calculating the quantity or number of the reference signal to be sent in time domain according to whether intra-slot frequency hopping of the reference signal is enabled and/or whether inter-slot frequency hopping of the reference signal is enabled, which includes at least one of manners described below.

(1) When intra-slot frequency hopping of an SRS is enabled and inter-slot frequency hopping of the SRS is disabled, $n_{SRS} = \lfloor i/R \rfloor$, where i=0, ..., N−1.

(2) When the inter-slot frequency hopping of the SRS is enabled and the intra-slot frequency hopping of the SRS is disabled, $$n_{SRS} = \left\lfloor \left(n_f \cdot N_{slot}^{frame,\mu} + n_{s,f}^{u}\right) \cdot \frac{1}{T_{SRS}} \right\rfloor.$$

(3) When the intra-slot frequency hopping of the SRS is enabled and the inter-slot frequency hopping of the SRS is disabled, $$n_{SRS} = \left\lfloor \left(n_f \cdot N_{slot}^{frame,\mu} + n_{s,f}^{u}\right) \cdot \frac{N}{R} \cdot \frac{1}{T_{SRS}} \right\rfloor + \lfloor i/R \rfloor,$$

where $n_{s,f}^{\mu} \in \{0, \ldots, N_{slot}^{frame,\mu}-1\}$ and is the slot index within a frame, $n_f$ is the system frame number, $N_{slot}^{frame,\mu}$ the quantity of slots in one system frame, $T_{SRS}$ is the period of the reference signal, N is the quantity of time domain symbols for sending the reference signal and configured within the slot, R is the quantity of time domain symbols repeated within the slot or the quantity of time domain symbols of the reference signal occupying the same frequency domain position within the slot, $n_{SRS}$ is the quantity or number of the uplink reference signal to be sent in time domain, and i is the index or number of the time domain symbol for sending the reference signal within the slot.

Embodiment Three

Based on Embodiment one, the first communication node determines the frequency domain resource by a method described below.

In an embodiment, a frequency domain position of the reference signal is determined according to a quantity or number of an uplink reference signal to be sent in time domain, and the frequency domain resource is determined according to the frequency domain position.

In an embodiment, the quantity or number of the uplink reference signal to be sent in time domain is determined based on at least one of the following parameters: a slot index within a frame, a system frame number, a period of the reference signal, a slot offset of the reference signal, a quantity of slots in one subframe, a quantity of slots in one system frame, a quantity of time domain symbols for sending the reference signal within a slot, a quantity of time domain symbols repeated within the slot or a quantity of time domain symbols of the reference signal occupying a same frequency domain position within the slot, or an index or number of a time domain symbol for sending the reference signal within the slot.

In an embodiment, the quantity or number of the uplink reference signal to be sent in time domain is obtained according to a following formula:

$$n_{SRS} = \alpha \cdot \left[ \left( n_f \cdot N_{slot}^{frame,\mu} + n_{s,f}^u \right) \cdot \frac{N}{R} \cdot \frac{1}{T_{SRS}} \right] + \lfloor i/R \rfloor,$$

where a value of $\alpha$ is 0 or 1, $n_{s,f}^\mu \in \{0, \ldots, N_{slot}^{frame,\mu}-1\}$ and is the slot index within a frame, $n_f$ is the system frame number, $N_{slot}^{frame,\mu}$ is the quantity of slots in one system frame, $T_{SRS}$ is the period of the reference signal, N is the quantity of time domain symbols for sending the reference signal and configured within the slot, R is the quantity of time domain symbols repeated within the slot or the quantity of time domain symbols of the reference signal occupying the same frequency domain position within the slot, $n_{SRS}$ is the quantity or number of the uplink reference signal to be sent in time domain, and i is the index or number of the time domain symbol for sending the reference signal within the slot.

In an embodiment, $\alpha$ is determined in at least one of the following manners: when intra-slot frequency hopping of the reference signal is enabled and/or inter-slot frequency hopping of the reference signal is disabled, $\alpha$ is 0, and when the intra-slot frequency hopping of the reference signal is disabled and the inter-slot frequency hopping of the reference signal is enabled, $\alpha$ is 1; or when the reference signal is an aperiodic reference signal, $\alpha$ is 0, and when the reference signal is a periodic reference signal, $\alpha$ is 1.

Embodiment Four

Figure 2:
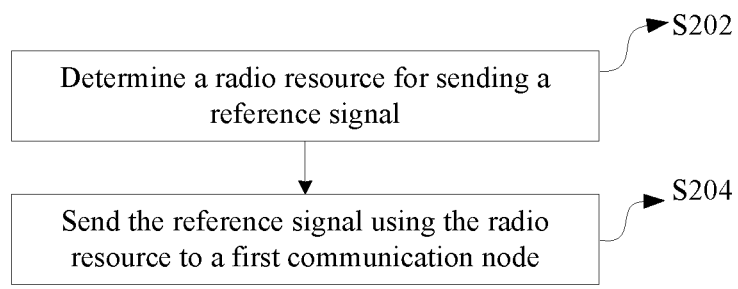
FIG. 2 is a flowchart of a communication method according to another embodiment.

This embodiment provides a communication method executed on the network architecture described above. FIG. 2 is a flowchart of a communication method according to another embodiment. The method is applied to a second communication node. As shown in FIG. 2, the method according to this embodiment includes steps S202 and S204.

In S202, a radio resource for sending a reference signal is determined.

In S204, the reference signal is sent using the radio resource to a first communication node.

In this embodiment, the radio resource includes a time domain resource or a frequency domain resource.

In an embodiment, the second communication node determines the time domain resource according to at least one of the following parameters: a period of an uplink sounding reference signal, a slot offset of the reference signal, a system frame number, a slot index within a frame, a quantity of slots in one subframe or a quantity of slots in one system frame.

In an embodiment, the second communication node determines the period of the reference signal and the slot offset of the reference signal according to a configuration index of the reference signal, where determining manners are shown in Table 5, Table 6, Table 7 or Table 8.

TABLE 5

| SRS Configuration Index $I_{SRS}$ | SRS Period $T_{SRS}$ (Slots) | SRS Slot Offset $T_{offset}$ |
| --- | --- | --- |
| 0 | 1 | $I_{SRS}$ |
| 1-2 | 2 | $I_{SRS} - 1$ |
| 3-7 | 5 | $I_{SRS} - 3$ |
| 8-17 | 10 | $I_{SRS} - 8$ |
| 18-37 | 20 | $I_{SRS} - 18$ |
| 38-77 | 40 | $I_{SRS} - 38$ |
| 78-157 | 80 | $I_{SRS} - 78$ |
| 158-317 | 160 | $I_{SRS} - 158$ |
| 318-637 | 320 | $I_{SRS} - 318$ |
| 638-1277 | 640 | $I_{SRS} - 638$ |
| 1278-2557 | 1280 | $I_{SRS} - 1278$ |
| 2558-5117 | 2560 | $I_{SRS} - 2558$ |
| 5118-8191 | Reserved | Reserved |

TABLE 6

| SRS Configuration Index $I_{SRS}$ | SRS Period $T_{SRS}$ (Slots) | SRS Slot Offset $T_{offset}$ |
| --- | --- | --- |
| 0 | 1 | $I_{SRS}$ |
| 1-2 | 2 | $I_{SRS} - 1$ |
| 3-6 | 4 | $I_{SRS} - 3$ |
| 7-11 | 5 | $I_{SRS} - 7$ |
| 12-19 | 8 | $I_{SRS} - 12$ |
| 20-29 | 10 | $I_{SRS} - 20$ |
| 30-45 | 16 | $I_{SRS} - 30$ |
| 46-65 | 20 | $I_{SRS} - 46$ |
| 66-97 | 32 | $I_{SRS} - 66$ |
| 98-137 | 40 | $I_{SRS} - 98$ |
| 138-201 | 64 | $I_{SRS} - 138$ |
| 202-281 | 80 | $I_{SRS} - 202$ |
| 282-441 | 160 | $I_{SRS} - 282$ |
| 442-761 | 320 | $I_{SRS} - 442$ |
| 762-1401 | 640 | $I_{SRS} - 762$ |
| 1402-2681 | 1280 | $I_{SRS} - 1402$ |
| 2682-5241 | 2560 | $I_{SRS} - 2682$ |
| 5242-8191 | Reserved | Reserved |

TABLE 7

| SRS Configuration Index $I_{SRS}$ | SRS Period $T_{SRS}$ (Slots) | SRS Slot Offset $T_{offset}$ |
| --- | --- | --- |
| 0 | 1 | $I_{SRS}$ |
| 1-2 | 2 | $I_{SRS} - 1$ |
| 3-6 | 4 | $I_{SRS} - 3$ |
| 7-11 | 5 | $I_{SRS} - 7$ |
| 12-19 | 8 | $I_{SRS} - 12$ |
| 20-29 | 10 | $I_{SRS} - 20$ |
| 30-45 | 16 | $I_{SRS} - 30$ |
| 46-65 | 20 | $I_{SRS} - 46$ |
| 66-97 | 32 | $I_{SRS} - 66$ |
| 98-137 | 40 | $I_{SRS} - 98$ |
| 138-201 | 64 | $I_{SRS} - 138$ |
| 202-281 | 80 | $I_{SRS} - 202$ |
| 282-409 | 128 | $I_{SRS} - 282$ |
| 410-569 | 160 | $I_{SRS} - 410$ |
| 570-825 | 256 | $I_{SRS} - 570$ |
| 826-1145 | 320 | $I_{SRS} - 826$ |
| 1146-1657 | 512 | $I_{SRS} - 1146$ |

TABLE 7-continued

| SRS Configuration Index $I_{SRS}$ | SRS Period $T_{SRS}$ (Slots) | SRS Slot Offset $T_{offset}$ |
|---|---|---|
| 1658-2297 | 640 | $I_{SRS}$ − 1658 |
| 2298-3321 | 1024 | $I_{SRS}$ − 2298 |
| 3322-4601 | 1280 | $I_{SRS}$ − 3322 |
| 4602-6649 | 2048 | $I_{SRS}$ − 4602 |
| 6650-9209 | 2560 | $I_{SRS}$ − 6650 |
| 9210-16383 | Reserved | Reserved |

TABLE 8

| SRS Configuration Index $I_{SRS}$ | SRS Period $T_{SRS}$ (Slots) | SRS Slot Offset $T_{offset}$ |
|---|---|---|
| 0 | 1 | $I_{SRS}$ |
| 1-2 | 2 | $I_{SRS}$ − 1 |
| 3-6 | 4 | $I_{SRS}$ − 3 |
| 7-11 | 5 | $I_{SRS}$ − 7 |
| 12-19 | 8 | $I_{SRS}$ − 12 |
| 20-29 | 10 | $I_{SRS}$ − 20 |
| 30-45 | 16 | $I_{SRS}$ − 30 |
| 46-65 | 20 | $I_{SRS}$ − 46 |
| 66-97 | 32 | $I_{SRS}$ − 66 |
| 98-137 | 40 | $I_{SRS}$ − 98 |
| 138-201 | 64 | $I_{SRS}$ − 138 |
| 202-281 | 80 | $I_{SRS}$ − 202 |
| 282-409 | 128 | $I_{SRS}$ − 282 |
| 410-569 | 160 | $I_{SRS}$ − 410 |
| 570-825 | 256 | $I_{SRS}$ − 570 |
| 826-1145 | 320 | $I_{SRS}$ − 826 |
| 1146-1657 | 512 | $I_{SRS}$ − 1146 |
| 1658-2297 | 640 | $I_{SRS}$ − 1658 |
| 2298-3321 | 1024 | $I_{SRS}$ − 2298 |
| 3322-4601 | 1280 | $I_{SRS}$ − 3322 |
| 4602-7161 | 2560 | $I_{SRS}$ − 4602 |
| 7162-8191 | Reserved | Reserved |

In an embodiment, the period of the reference signal and the slot offset of the reference signal have a unit of slots or milliseconds.

In an embodiment, the time domain resource satisfies one of the following relationships:

$$(10 \cdot n_f \cdot N_{slot}^{subframe,\mu} + n_{s,f}^{\mu} - T_{offset}) \bmod T_{SRS} = 0 \text{ or}$$

$$(n_f \cdot N_{slot}^{frame,\mu} + n_{s,f}^{\mu} - T_{offset}) \bmod T_{SRS} = 0;$$

where $n_{s,f}^{\mu} \in \{0, \ldots, N_{slot}^{frame,\mu} - 1\}$, $n_{s,f}^{\mu}$ is the slot index within a frame, is the system frame number, $N_{slot}^{subframe,\mu}$ the quantity of slots in one subframe, $N_{slot}^{frame,\mu}$ is the quantity of slots in one system frame, $T_{offset}$ the slot offset of the reference signal, and $T_{SRS}$ is the period of the reference signal; where an uplink reference signal is an uplink sounding reference signal.

Embodiment Five

Based on Embodiment four, the second communication node determines the frequency domain resource by a method described below.

In an embodiment, a frequency domain position of the reference signal is determined according to a quantity or number of an uplink reference signal to be sent in time domain, and the frequency domain resource is determined according to the frequency domain position.

In an embodiment, the quantity or number of the uplink reference signal to be sent in time domain is determined based on at least one of the following parameters: a slot index within a frame, a system frame number, a period of the reference signal, a slot offset of the reference signal, a quantity of slots in one subframe, a quantity of slots in one system frame, a quantity of time domain symbols for sending the reference signal within a slot, a quantity of time domain symbols repeated within the slot or a quantity of time domain symbols of the reference signal occupying a same frequency domain position within the slot, or an index or number of a time domain symbol for sending the reference signal within the slot.

In an embodiment, the second communication node determines a manner for calculating the quantity or number of the reference signal to be sent in time domain according to whether intra-slot frequency hopping of the reference signal is enabled and/or whether inter-slot frequency hopping of the reference signal is enabled, which includes at least one of manners described below.

(1) When the intra-slot frequency hopping of the reference signal is enabled and the inter-slot frequency hopping of the reference signal is disabled, $n_{SRS} \lfloor i/R \rfloor$, where $i=0, \ldots, N-1$.

(2) When the inter-slot frequency hopping of the reference signal is enabled and the intra-slot frequency hopping of the reference signal is disabled, $$n_{SRS} = \left\lfloor \left(n_f \cdot N_{slot}^{frame,\mu} + n_{s,f}^{u}\right) \cdot \frac{1}{T_{SRS}} \right\rfloor.$$

(3) When the intra-slot frequency hopping of the reference signal is enabled and the inter-slot frequency hopping of the reference signal is enabled, $$n_{SRS} = \left\lfloor \left(n_f \cdot N_{slot}^{frame,\mu} + n_{s,f}^{u}\right) \cdot \frac{N}{R} \cdot \frac{1}{T_{SRS}} \right\rfloor + \lfloor i/R \rfloor.$$

$$n_{s,f}^{\mu} \in \{0, \ldots, N_{slot}^{frame,\mu} - 1\}$$

and is the slot index within a frame, $n_f$ is the system frame number, $N_{slot}^{frame,\mu}$ is the quantity of slots in one system frame, $T_{SRS}$ is the period of the reference signal, N is the quantity of time domain symbols for sending the reference signal and configured within the slot, R is the quantity of time domain symbols repeated within the slot or the quantity of time domain symbols of the reference signal occupying the same frequency domain position within the slot, $n_{SRS}$ is the quantity or number of the uplink reference signal to be sent in time domain, and i is the index or number of the time domain symbol for sending the reference signal within the slot.

Embodiment Six

Based on Embodiment four, the second communication node determines the frequency domain resource by a method described below.

In an embodiment, a frequency domain position of the reference signal is determined according to a quantity or number of an uplink reference signal to be sent in time domain, and the frequency domain resource is determined according to the frequency domain position.

In an embodiment, the quantity or number of the uplink reference signal to be sent in time domain is obtained based on at least one of the following parameters: a slot index within a frame, a system frame number, a period of the reference signal, a slot offset of the reference signal, a quantity of slots in one subframe, a quantity of slots in one system frame, a quantity of time domain symbols for sending the reference signal within a slot, a quantity of time domain symbols repeated within the slot or a quantity of time domain symbols of the reference signal occupying a same frequency domain position within the slot, or an index or number of a time domain symbol for sending the reference signal within the slot.

In an embodiment, the quantity or number of the uplink reference signal to be sent in time domain is determined according to a following formula:

$$n_{SRS} = \alpha \cdot \left\lfloor \left(n_f \cdot N_{slot}^{frame,\mu} + n_{s,f}^u\right) \cdot \frac{N}{R} \cdot \frac{1}{T_{SRS}} \right\rfloor + \lfloor i/R \rfloor,$$

where a value of $\alpha$ is 0 or 1, $n_{s,f}^{\mu} \in \{0, \ldots, N_{slot}^{frame,\mu}-1\}$ and is the slot index within a frame, $n_f$ is the system frame number, $N_{slot}^{frame,\mu}$ is the quantity of slots in one system frame, $T_{SRS}$ is the period of the reference signal, N is the quantity of time domain symbols for sending the reference signal and configured within the slot, R is the quantity of time domain symbols repeated within the slot or the quantity of time domain symbols of the reference signal occupying the same frequency domain position within the slot, $n_{SRS}$ is the quantity or number of the uplink reference signal to be sent in time domain, and i is the index or number of the time domain symbol for sending the reference signal within the slot.

In an embodiment, $\alpha$ is determined in at least one of the following manners: when intra-slot frequency hopping of an SRS is enabled and/or inter-slot frequency hopping of the SRS is disabled, $\alpha$ is 0, and when the intra-slot frequency hopping of the SRS is disabled and the inter-slot frequency hopping of the SRS is enabled, $\alpha$ is 1; or when the SRS is an aperiodic SRS, a is 0, and when the SRS is a periodic SRS, $\alpha$ is 1.

Embodiment Seven

This embodiment further provides a communication system for implementing the embodiments and exemplary implementation manners described above. What has been described will not be repeated. As used below, the term "module" may be software, hardware or a combination thereof capable of implementing predetermined functions. The device described below in the embodiment may be implemented by software, but implementation by hardware or by a combination of software and hardware is also possible and conceived.

Figure 3:
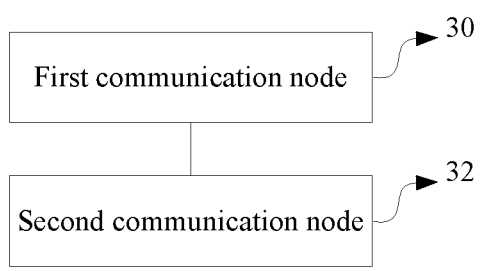
FIG. 3 is a block diagram of a communication system according to an embodiment.

FIG. 3 is a block diagram of a communication system according to an embodiment. As shown in FIG. 3, the communication system according to this embodiment includes a first communication node 30 and a second communication node 32.

The first communication node 30 includes a first determining module 300 and a receiving module 302. The first determining module 300 is configured to determine a radio resource for the second communication node to send a reference signal. The receiving module 302 is configured to receive the reference signal sent by the second communication node using the radio resource.

The second communication node 32 includes a second determining module 320 and a sending module 322. The second determining module 320 is configured to determine the radio resource for sending the reference signal. The sending module 322 is configured to send the reference signal using the radio resource.

The various modules described above may be implemented by software or hardware. Implementation by hardware may, but may not necessarily, be performed in the following manner: the various modules described above are located in a same processor or located in different processors in any combination form.

A processor is further provided in the present disclosure. The processor is configured to execute programs which, when executed, perform the method according to any one of the embodiments described above.

In this embodiment, the programs are used for performing steps described below.

In S10, a radio resource for a second communication node to send a reference signal is determined.

In S20, the reference signal sent by the second communication node using the radio resource is received.

In an embodiment, for specific examples in this embodiment, reference may be made to the examples described in the embodiments and optional implementation manners described above, and repetition will not be made in this embodiment.

Various modules or various steps described above of the present disclosure may be implemented by a general-purpose computing device, and the various modules or various steps described above may be concentrated on a single computing device or distributed on a network composed of multiple computing devices. In an embodiment, the various modules or various steps described above may be implemented by program codes executable by the computing device, so that the various modules or various steps described above may be stored in a storage device to be executed by the computing device. In some circumstances, the illustrated or described steps may be executed in sequences different from those described herein. Alternatively, the various modules or various steps described above may be separately made into multiple integrated circuit modules, or multiple modules or steps therein may be made into a single integrated circuit module for implementation. In this way, the present disclosure is not limited to any specific combination of hardware and software.

What is claimed is:

1. A communication method of a reference signal, applied to a first communication node, comprising:
   determining a radio resource for a second communication node to send the reference signal; and
   receiving the reference signal sent by the second communication node using the radio resource,
   wherein the radio resource comprises a time domain resource;
   wherein determining the radio resource for the second communication node to send the reference signal comprises:
   determining, by the first communication node, the time domain resource according to following parameters: a period of the reference signal, and a slot offset of the reference signal, wherein
      when the period of the reference signal is 1, the slot offset of the reference signal is empty;
      when the period of the reference signal is 1280, the slot offset of the reference signal is an integer greater than or equal to 0 and less than or equal to 1279; and
      when the period of the reference signal is 2560, the slot offset of the reference signal is an integer greater than or equal to 0 and less than or equal to 2559;

wherein the parameters further comprise at least one of: a system frame number, a slot index within a frame, a quantity of slots in one subframe or a quantity of slots in one system frame;

wherein the time domain resource satisfies the following relationship:

$$(10 \cdot n_f \cdot N_{slot}^{subframe,\mu} + n_{s,f}^{\mu} - T_{offset}) \bmod T_{SRS} = 0;$$

wherein $n_{s,f}^{\mu} \in \{0, \ldots, N_{slot}^{frame,\mu}-1\}$, $n_{s,f}^{\mu}$ is the slot index within a frame, $n_f$ is the system frame number, $N_{slot}^{subframe,\mu}$ is the quantity of slots in one subframe, slot $N_{slot}^{subframe,\mu}$ is the quantity of slots in one system frame, $T_{offset}$ is the slot offset of the reference signal, and $T_{SRS}$ the period of the reference signal; and wherein the reference signal is an uplink sounding reference signal.

2. The method of claim 1, wherein relations between the period of the reference signal and the slot offset of the reference signal further comprise at least one of:
when the period of the reference signal is 2, the slot offset of the reference signal is an integer greater than or equal to 0 and less than or equal to 1;
when the period of the reference signal is 4, the slot offset of the reference signal is an integer greater than or equal to 0 and less than or equal to 3;
when the period of the reference signal is 5, the slot offset of the reference signal is an integer greater than or equal to 0 and less than or equal to 4;
when the period of the reference signal is 8, the slot offset of the reference signal is an integer greater than or equal to 0 and less than or equal to 7;
when the period of the reference signal is 10, the slot offset of the reference signal is an integer greater than or equal to 0 and less than or equal to 9;
when the period of the reference signal is 16, the slot offset of the reference signal is an integer greater than or equal to 0 and less than or equal to 15;
when the period of the reference signal is 20, the slot offset of the reference signal is an integer greater than or equal to 0 and less than or equal to 19;
when the period of the reference signal is 32, the slot offset of the reference signal is an integer greater than or equal to 0 and less than or equal to 31;
when the period of the reference signal is 40, the slot offset of the reference signal is an integer greater than or equal to 0 and less than or equal to 39;
when the period of the reference signal is 64, the slot offset of the reference signal is an integer greater than or equal to 0 and less than or equal to 63;
when the period of the reference signal is 80, the slot offset of the reference signal is an integer greater than or equal to 0 and less than or equal to 79;
when the period of the reference signal is 160, the slot offset of the reference signal is an integer greater than or equal to 0 and less than or equal to 159;
when the period of the reference signal is 320, the slot offset of the reference signal is an integer greater than or equal to 0 and less than or equal to 319; or
when the period of the reference signal is 640, the slot offset of the reference signal is an integer greater than or equal to 0 and less than or equal to 639.

3. The method of claim 1, wherein a value of the period of the reference signal comprises at least one of: 1, 2, 4, 5, 8, 10, 16, 20, 32, 40, 64, 80, 128, 160, 256, 320, 512, 640, 1024, 1280, 2048 or 2560.

4. The method of claim 1, wherein the period of the reference signal and the slot offset of the reference signal have a unit of slots or milliseconds.

5. The method of claim 1, wherein the radio resource further comprises a frequency domain resource;
wherein determining the radio resource for the second communication node to send the reference signal comprises:
in response to the reference signal being an uplink sounding reference signal, determining a frequency domain position of the reference signal according to a quantity or number of the uplink sounding reference signal to be sent in time domain, and determining the frequency domain resource according to the frequency domain position,
wherein the quantity or number of the uplink sounding reference signal to be sent in time domain is determined based on at least one of following parameters:
a slot index within a frame, a system frame number, a period of the reference signal, a slot offset of the reference signal, a quantity of slots in one subframe, a quantity of slots in one system frame, a quantity of time domain symbols for sending the reference signal within a slot, a quantity of time domain symbols repeated within the slot or a quantity of time domain symbols of the reference signal occupying a same frequency domain position within the slot, or an index or number of a time domain symbol for sending the reference signal within the slot.

6. The method of claim 5, further comprising:
determining, by the first communication node, the quantity or number of the reference signal to be sent in time domain in at least one of following manners:
in response to enabling intra-slot frequency hopping of the reference signal and disabling inter-slot frequency hopping of the reference signal, $n_{SRS}\lfloor i/R \rfloor$, wherein $i=0, \ldots, N-1$;
in response to enabling the inter-slot frequency hopping of the reference signal and disabling the intra-slot frequency hopping of the reference signal, $$n_{SRS} = \left\lfloor \left(n_f \cdot N_{slot}^{frame,\mu} + n_{s,f}^{\mu}\right) \cdot \frac{1}{T_{SRS}} \right\rfloor;$$

or in response to enabling the intra-slot frequency hopping of the reference signal and enabling the inter-slot frequency hopping of the reference signal, $$n_{SRS} = \left\lfloor \left(n_f \cdot N_{slot}^{frame,\mu} + n_{s,f}^{\mu}\right) \cdot \frac{N}{R} \cdot \frac{1}{T_{SRS}} \right\rfloor + \lfloor i/R \rfloor;$$

wherein $n_{s,f}^{\mu} \in \{0, \ldots, N_{slot}^{frame,\mu}-1\}$, $n_{s,f}^{\mu}$ is a slot index within a frame, $n_f$ is a system frame number, $N_{slot}^{frame,\mu}$ a quantity of slots in one system frame, $T_{SRS}$ is a period of the reference signal, N is a quantity of time domain symbols for sending the reference signal and configured within a slot, R is a quantity of time domain symbols repeated within the slot or a quantity of time domain symbols of the reference signal occupying a same frequency domain position within the slot, $n_{SRS}$ is the quantity or number of the uplink sounding reference signal to be sent in time domain, and i is an index or number of a time domain symbol for sending the reference signal within the slot.

7. The method of claim 5, wherein the quantity or number of the uplink sounding reference signal to be sent in time domain is determined according to a following formula:

$$n_{SRS} = \alpha \cdot \left\lfloor \left( n_f \cdot N_{slot}^{frame,\mu} + n_{s,f}^u \right) \cdot \frac{N}{R} \cdot \frac{1}{T_{SRS}} \right\rfloor + \lfloor i/R \rfloor;$$

wherein a value of α is 0 or 1, $n_{s,f}^\mu \in \{0, \ldots, N_{slot}^{frame,\mu}-1\}$, $n_{s,f}^\mu$ is a slot index within a fame, $n_f$ is a system frame number, $N_{slot}^{frame,\mu}$ is a quantity of slots in one system frame, $T_{SRS}$ is a period of the reference signal, N is a quantity of time domain symbols for sending the reference signal and configured within a slot, R is a quantity of time domain symbols repeated within the slot or a quantity of time domain symbols of the reference signal occupying a same frequency domain position within the slot, $n_{SRS}$ is the quantity or number of the uplink sounding reference signal to be sent in time domain, and i is an index or number of a time domain symbol for sending the reference signal within the slot.

8. A communication method of a reference signal, applied to a second communication node, comprising:
determining a radio resource for sending the reference signal; and
sending the reference signal using the radio resource to a first communication node, wherein the radio resource comprises a time domain resource;
wherein determining the radio resource for sending the reference signal comprises:
determining, by the second communication node, the time domain resource according to following parameters: a period of the reference signal, and a slot offset of the reference signal, wherein
when the period of the reference signal is 1, the slot offset of the reference signal is empty;
when the period of the reference signal is 1280, the slot offset of the reference signal is an integer greater than or equal to 0 and less than or equal to 1279; and
when the period of the reference signal is 2560, the slot offset of the reference signal is an integer greater than or equal to 0 and less than or equal to 2559
wherein the parameters further comprise at least one of: a system frame number, a slot index within a frame, a quantity of slots in one subframe or a quantity of slots in one system frame;
wherein the time domain resource satisfies the following relationship:

$(10 \cdot n_f \cdot N_{slot}^{subframe,\mu} + n_{s,f}^\mu - T_{offset}) \bmod T_{SRS} = 0$ or
wherein $n_{s,f}^\mu \in \{0, \ldots, N_{slot}^{frame,\mu}-1\}$, $n_{s,f}^\mu$ is the slot index within a frame, $n_f$ is the system frame number, $N_{slot}^{subframe,\mu}$ of slots in one subframe, $N_{slot}^{subframe,\mu}$ is the quantity of slots in one system frame, $T_{offset}$ is the slot offset of the reference signal, and $T_{SRS}$ the period of the reference signal; and
wherein the reference signal is an uplink sounding reference signal.

9. The method of claim 8, wherein relations between the period of the reference signal and the slot offset of the reference signal further comprise at least one of:
when the period of the reference signal is 2, the slot offset of the reference signal is an integer greater than or equal to 0 and less than or equal to 1;
when the period of the reference signal is 4, the slot offset of the reference signal is an integer greater than or equal to 0 and less than or equal to 3;
when the period of the reference signal is 5, the slot offset of the reference signal is an integer greater than or equal to 0 and less than or equal to 4;
when the period of the reference signal is 8, the slot offset of the reference signal is an integer greater than or equal to 0 and less than or equal to 7;
when the period of the reference signal is 10, the slot offset of the reference signal is an integer greater than or equal to 0 and less than or equal to 9;
when the period of the reference signal is 16, the slot offset of the reference signal is an integer greater than or equal to 0 and less than or equal to 15;
when the period of the reference signal is 20, the slot offset of the reference signal is an integer greater than or equal to 0 and less than or equal to 19;
when the period of the reference signal is 32, the slot offset of the reference signal is an integer greater than or equal to 0 and less than or equal to 31;
when the period of the reference signal is 40, the slot offset of the reference signal is an integer greater than or equal to 0 and less than or equal to 39;
when the period of the reference signal is 64, the slot offset of the reference signal is an integer greater than or equal to 0 and less than or equal to 63;
when the period of the reference signal is 80, the slot offset of the reference signal is an integer greater than or equal to 0 and less than or equal to 79;
when the period of the reference signal is 160, the slot offset of the reference signal is an integer greater than or equal to 0 and less than or equal to 159;
when the period of the reference signal is 320, the slot offset of the reference signal is an integer greater than or equal to 0 and less than or equal to 319; or
when the period of the reference signal is 640, the slot offset of the reference signal is an integer greater than or equal to 0 and less than or equal to 639.

10. The method of claim 8, wherein a value of the period of the reference signal comprises at least one of: 1, 2, 4, 5, 8, 10, 16, 20, 32, 40, 64, 80, 128, 160, 256, 320, 512, 640, 1024, 1280, 2048 or 2560.

11. The method of claim 8, wherein the period of the reference signal and the slot offset of the reference signal have a unit of slots or milliseconds.

12. The method of claim 8, wherein the radio resource further comprises a frequency domain resource;
wherein determining the radio resource for sending the reference signal comprises:
in response to the reference signal being an uplink sounding reference signal, determining a frequency domain position of the reference signal according to a quantity or number of the uplink sounding reference signal to be sent in time domain, and determining the frequency domain resource according to the frequency domain position,
wherein the quantity or number of the uplink sounding reference signal to be sent in time domain is determined based on at least one of following parameters:
a slot index within a frame, a system frame number, a period of the reference signal, a slot offset of the reference signal, a quantity of slots in one subframe, a quantity of slots in one system frame, a quantity of time domain symbols for sending the reference signal within a slot, a quantity of time domain symbols repeated within the slot or a quantity of time domain symbols of the reference signal occupying a same frequency domain position within the slot, or an index or number of a time domain symbol for sending the reference signal within the slot.

13. The method of claim 12, further comprising:
determining, by the second communication node, the quantity or number of the reference signal to be sent in time domain in at least one of following manners:
in response to enabling intra-slot frequency hopping of the reference signal and disabling inter-slot frequency hopping of the reference signal, $n_{SRS}\lfloor i/R \rfloor$, wherein i=0, . . . ,N−1;
in response to enabling the inter-slot frequency hopping of the reference signal and disabling the intra-slot frequency hopping of the reference signal, $$n_{SRS} = \left\lfloor \left( n_f \cdot N_{slot}^{frame,\mu} + n_{s,f}^u \right) \cdot \frac{1}{T_{SRS}} \right\rfloor;$$

or in response to enabling the intra-slot frequency hopping of the reference signal and enabling the inter-slot frequency hopping of the reference signal, $$n_{SRS} = \left\lfloor \left( n_f \cdot N_{slot}^{frame,\mu} + n_{s,f}^u \right) \cdot \frac{1}{T_{SRS}} \right\rfloor n_{SRS} = \left\lfloor \left( n_f \cdot N_{slot}^{frame,\mu} + n_{s,f}^u \right) \cdot \frac{N}{R} \cdot \frac{1}{T_{SRS}} \right\rfloor + \lfloor i/R \rfloor;$$

wherein $n_{s,f}^\mu \in \{0, \ldots, N_{slot}^{frame,\mu}-1\}$, $n_{s,f}^\mu$ is a slot index within a frame, $n_f$ is a system frame number, $N_{slot}^{subframe,\mu}$ is a quantity of slots in one system frame, $T_{SRS}$ is a period of the reference signal, N is a quantity of time domain symbols for sending the reference signal and configured within a slot, R is a quantity of time domain symbols repeated within the slot or a quantity of time domain symbols of the reference signal occupying a same frequency domain position within the slot, $n_{SRS}$ is the quantity or number of the uplink sounding reference signal to be sent in time domain, and i is an index or number of a time domain symbol for sending the reference signal within the slot.

14. The method of claim 12, wherein the quantity or number of the uplink sounding reference signal to be sent in time domain is obtained according to one of following formulas:

$$n_{SRS} = \alpha \cdot \left\lfloor \left( n_f \cdot N_{slot}^{frame,\mu} + n_{s,f}^u \right) \cdot \frac{N}{R} \cdot \frac{1}{T_{SRS}} \right\rfloor + \lfloor i/R \rfloor;$$

wherein a value of α is 0 or 1, $n_{s,f}^\mu \in \{0, \ldots, N_{slot}^{frame,\mu}-1\}$, $n_{s,f}^\mu$ is a slot index within a frame, $n_f$ is a system frame number, $N_{slot}^{subframe,\mu}$ is a quantity of slots in one system frame, $T_{SRS}$ is a period of the reference signal, N is a quantity of time domain symbols for sending the reference signal and configured within a slot, R is a quantity of time domain symbols repeated within the slot or a quantity of time domain symbols of the reference signal occupying a same frequency domain position within the slot, $n_{SRS}$ is the quantity or number of the uplink sounding reference signal to be sent in time domain, and i is an index or number of a time domain symbol for sending the reference signal within the slot.

15. A non-transitory storage medium, comprising stored programs, wherein the programs, when executed, perform a communication method of a reference signal,
wherein the method comprises:
determining a radio resource for sending the reference signal; and
sending the reference signal using the radio resource to a first communication node, wherein the radio resource comprises a time domain resource;
wherein determining the radio resource for sending the reference signal comprises:
determining the time domain resource according to following parameters: a period of the reference signal, and a slot offset of the reference signal, wherein
when the period of the reference signal is 1, the slot offset of the reference signal is empty;
when the period of the reference signal is 1280, the slot offset of the reference signal is an integer greater than or equal to 0 and less than or equal to 1279; and
when the period of the reference signal is 2560, the slot offset of the reference signal is an integer greater than or equal to 0 and less than or equal to 2559;
wherein the parameters further comprise at least one of: a system frame number, a slot index within a frame, a quantity of slots in one subframe or a quantity of slots in one system frame;
wherein the time domain resource satisfies the following relationship:

$$(10 \cdot n_f N_{slot}^{subframe,\mu} + n_{s,f}^\mu - T_{offset}) \bmod T_{SRS} = 0 \text{ or}$$

wherein $n_{s,f}^\mu \in \{0, \ldots, N_{slot}^{frame,\mu}-1\}$, $n_{s,f}^\mu$ is the slot index within a frame, $n_f$ is the system frame number, $N_{slot}^{subframe,\mu}$ is the quantity of slots in one subframe, $N_{slot}^{subframe,\mu}$ is the quantity of slots in one system frame, $T_{offset}$ is the slot offset of the reference signal, and $T_{SRS}$ the period of the reference signal; and
wherein the reference signal is an uplink sounding reference signal.

16. The non-transitory storage medium of claim 15, wherein relations between the period of the reference signal and the slot offset of the reference signal further comprise at least one of:
when the period of the reference signal is 2, the slot offset of the reference signal is an integer greater than or equal to 0 and less than or equal to 1;
when the period of the reference signal is 4, the slot offset of the reference signal is an integer greater than or equal to 0 and less than or equal to 3;
when the period of the reference signal is 5, the slot offset of the reference signal is an integer greater than or equal to 0 and less than or equal to 4;
when the period of the reference signal is 8, the slot offset of the reference signal is an integer greater than or equal to 0 and less than or equal to 7;
when the period of the reference signal is 10, the slot offset of the reference signal is an integer greater than or equal to 0 and less than or equal to 9;
when the period of the reference signal is 16, the slot offset of the reference signal is an integer greater than or equal to 0 and less than or equal to 15;

when the period of the reference signal is 20, the slot offset of the reference signal is an integer greater than or equal to 0 and less than or equal to 19;
when the period of the reference signal is 32, the slot offset of the reference signal is an integer greater than or equal to 0 and less than or equal to 31;
when the period of the reference signal is 40, the slot offset of the reference signal is an integer greater than or equal to 0 and less than or equal to 39;
when the period of the reference signal is 64, the slot offset of the reference signal is an integer greater than or equal to 0 and less than or equal to 63;
when the period of the reference signal is 80, the slot offset of the reference signal is an integer greater than or equal to 0 and less than or equal to 79;
when the period of the reference signal is 160, the slot offset of the reference signal is an integer greater than or equal to 0 and less than or equal to 159;
when the period of the reference signal is 320, the slot offset of the reference signal is an integer greater than or equal to 0 and less than or equal to 319; or
when the period of the reference signal is 640, the slot offset of the reference signal is an integer greater than or equal to 0 and less than or equal to 639.

* * * * *